Figure 1:
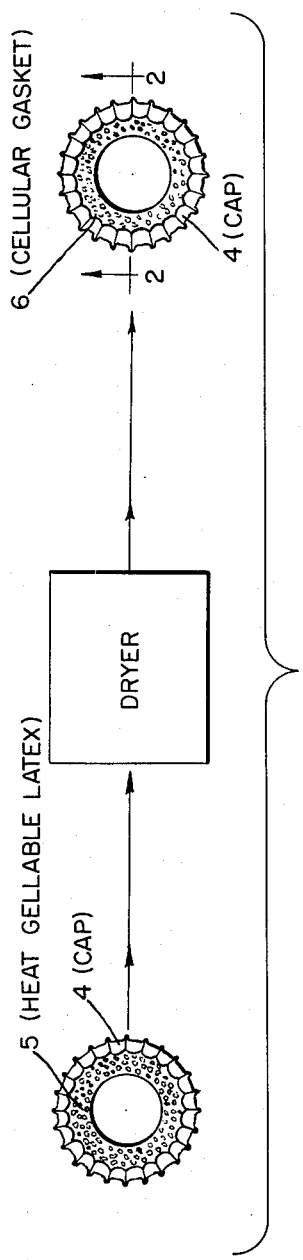

Jan. 5, 1965    M. PEZZUTO ETAL    3,164,486
METHOD OF PRODUCING GASKETS FOR CONTAINER CLOSURES
Filed May 9, 1962

INVENTOR.
MICHAEL PEZZUTO
ALLEN B. FOYE
BY
*Metri Kalimon*
ATTORNEY

3,164,486
METHOD OF PRODUCING GASKETS FOR CONTAINER CLOSURES

Michael Pezzuto, Burlington, and Allen B. Foye, West Bridgewater, Mass., assignors to W. R. Grace & Co., Cambridge, Mass., a corporation of Connecticut
Filed May 9, 1962, Ser. No. 193,623
9 Claims. (Cl. 117—43)

This invention relates to the formation of sealing gaskets for container closures, and more particularly to a method of drying a liquid gasketing composition which has been applied to a metal or plastic cap, home canning lid or other container closure.

A large proportion of container closures are provided with rubbery gaskets which have been deposited on the closures in the form of water-dispersed gasketing compositions and then dried in specially constructed ovens for a substantial period of time, often 60 to 90 minutes, at temperatures which usually range between 155° and 175° F. A substantial reduction of the drying time would be most desirable, in order to reduce fuel consumption and cost of handling, as well as to speed up the process of manufacture. During the lengthy drying period of water-dispersed gasketing compositions furthermore, the soaps and other protective, stabilizing ingredients in the composition tend to migrate toward and concentrate at the interface between the gasket and the closure. The result frequently is poor adhesion between the gasket and the closure or between the gasket and protective coating on the closure. Attempts to shorten the drying time by raising the oven temperature above the normal drying range have been unsuccessful, resulting in badly blistered, unacceptable gaskets.

It is an object of our invention, therefore, to develop a method by which liquid gasketing compositions based on water-dispersed polymeric materials, which have been deposited on container closures, may be very rapidly dried. More particularly, it is an object of our invention to devise a method by which the drying of such gaskets may be carried out at temperatures which are substantially higher than conventional drying temperatures, without causing blistering or disruption of the gaskets. A further object is the development of increased adhension between the gasket and the cap by preventing the migration of the stabilizing ingredients of the gasket composition to the gasket-cap interface. Finally, our invention has for its object the development of a method for drying gaskets which will be rapid and economical and which will result in the production of high quality gaskets of excellent sealing characteristics.

We have discovered that a water-dispersed liquid gasketing composition comprising a gellable latex containing a gas finely dispersed therein may be applied to container closures and dried at high temperatures with the production of puffed, cellular dried gaskets of excellent appearance and sealing characteristics.

Figure 2:
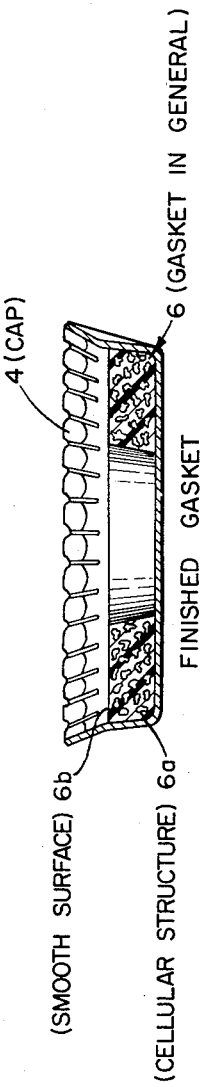

In the accompanying drawing FIGURE 1 is a diagrammatic view illustrating the successive steps of preparing a gasketed crown cap. FIGURE 2 is a cross-sectional view taken on line 2—2 of FIGURE 1 showing the finished gasket on an enlarged scale.

The liquid gasketing composition which is used in the process of our invention is a latex composition, i.e., a water dispersion of a natural or synthetic elastomeric polymer, which has been compounded in such a way that the latex sets or gels during the drying step, and which contains air or other gas finely dispersed within the latex composition. According to the process of our invention, the liquid gasketing composition 5 is deposited on a cap 4, home-canning lid, or other container closure and the closure is then subjected to an elevated temperature, for example between 220° and 400° F. until the latex has gelled and all the water has been expelled from the composition. The drying step is ordinarily accomplished in from 2 to 3 minutes, and requires not more than 10 minutes even with the very thick gaskets 6 used for pail covers and similar large closures. The dried gasket left behind on the container closure is not a solid gasket but is evenly puffed and has a fine, even cellular structure 6a. Because of its smooth, non-blistered surface 6b, it is useful for many sealing purposes without further modification. For certain sealing jobs where a solid gasket is preferred, the dried puffed gasket may be compacted by the application of pressure to give a compressed, solid gasket of the desired shape and dimensions, as described in copending application No. 6,878, filed February 5, 1960, now abandoned.

The latex composition used in the process of our invention must meet both the requirements set forth above in order to make it possible to carry out the novel quick-drying process of our invention, i.e., it must be compounded so that it sets to a firm gel concurrently with the exuplsion of the water from the compound and it must contain a quantity of air or other gas finely dispersed throughout the composition.

It is essential that the liquid gasketing composition set to a firm gel during actual evaporation of the water from the deposited gasket so that, when the water vapor is expelled from the gasket during the very rapid drying step, the mass will have sufficient cohesive strength to resist being blown apart by the force of the escaping vapors. We have found, in fact, that the gel formation must be initiated during the first half of the drying cycle in order to prevent blistering and actual disruption of the gasket. For this reason, the latex must be treated to render it gellable concurrently with the drying step. Gelling or coagulation due to dehydration of the compound is not sufficient for the purposes of our invention, since this takes place near the end of the drying cycle, when the escaping water vapor has already disrupted the gasket to the point where it cannot be used for sealing purposes.

A latex composition may be made geilable by any of a number of well-known expedients. It may, for example, contain a coagulant which is heat-activable, such as the zinc-ammonium complex salts, polyvinyl methyl ether and other well-known dormant coagulants. Delayed coagulants, for example sodium silicofluoride and the like, may also be used if they are added to the latex at such time as to bring about coagulation or gelling of the latex concurrently with the expulsion of water from the gasket in the drying step.

Another and particularly effective method of gelling the latex composition during the drying step is the use of latex stabilizers which are decomposed or denatured at elevated temperatures, thus bringing about the coagulation of the latex. Heat-sensitive stabilizers which may be used in the process of our invention are, for example, proteins such as egg or serium albumin, and the soaps of fugitive alkalies, such as ammonium oleate or the ammonium soaps of rosin acids. The amount of heat-sensitive stabilizer added to the latex may be adjusted as necessary in order to bring about or at least initiate gel formation during the first half of the drying cycle. In general, when heat-sensitive stabilizers are used, they are added to the latex in amounts just sufficient to impart stability to the latex.

The use of a liquid gasketing composition which has been rendered heat-gellable by employing a heat-sensitive stabilizer in the latex results in dried gaskets having particularly outstanding properties and is, therefore, a preferred embodiment of our invention. Gelation of a latex composition containing such a stabilizer proceeds slowly and gradually in contrast with the almost instantaneous action of the heat-activable coagulants, thus allowing the expulsion of a substantial proportion of the water vapor before the gasket material has become completely set. In this way, shrinkage of the gasket during the final stages of drying, with the resulting possibility of cracking or other deformation, is minimized.

The heat-sensitive stabilizer is preferably used in the smallest quantities which will yield a stable liquid composition. The actual amounts of stabilizer used will depend, of course, on the quantities of filler and other destabilizing ingredients in the composition. We have found that, in many cases, ammonium soaps may be used in as small amounts as two to three percent by weight of the elastomeric polymer in the composition. The use of heat-sensitive stabilizers has the further advantage that these sensitizers are converted during the drying process into insoluble materials, thus increasing the water-resistance of the dried gaskets.

It is also essential that the liquid gasketing composition which is deposited on the container closure contain air or other gas finely dispersed in the composition. In fact, when a water-based liquid gasketing composition which does not contain a dispersed gas, whether gellable or not, is subjected to the rapid drying process of our invention, the resulting dried gasket is an unsightly and useless blistered mass. The dispersed gas has the very important function of converting the liquid gasketing composition into a cellular gasket containing a multiplicity of interconnected small cells or pockets through which the escaping water vapor may pass. The dispersed gas also helps to prevent the formation of a continuous, impervious film of elastomer over the drying gasket, thus allowing the moisture to be removed very rapidly from the composition without blistering or disruption of the gasket.

It is indeed surprising that the sealing compositions used in the process of our invention must contain small bubbles of finely dispersed gas in order to prevent blistering, particularly in view of our previous experience with the manufacture of gasketing material for container closures. It has long been the practice, in order to prevent the formation of large air bubbles and blisters in the dried gaskets, to eliminate air or other gas from the composition. For this reason, the manufacture of gasketing material normally takes place in a vacuum mixer, with every precaution being taken to avoid introducing air with the various compounding ingredients. In contrast to this practice, and in seeming contradiction to all the teachings of the prior art, we deliberately incorporate relatively large quantities of dispersed gas into the composition.

There are a number of ways in which air or other gas can be introduced into a latex composition, as for example by stirring after the latex has been compounded, by introducing a separately prepared foam or soap-suds, by the use of a blowing agent, by bubbling a compressed gas such as nitrogen into the composition or by any combination thereof. Since these methods tend to introduce large bubbles of gas into the composition, we prefer to use a method in which air is introduced with the fillers. It is a well-known fact that large quantities of air are occluded on or otherwise associated with finely divided filler materials, and that air in finely divided form is introduced into a latex composition by adding fillers to the latex. The fillers may be added as dry powders if the latex is sufficiently stabilized or may first be stirred into a solution of the stabilizer. Wetting the fillers with plain water before adding to the latex is not practical for the purpose of introducing air into the composition, since the occluded air is displaced by the water and, as a result, no air will be carried into the latex. On the other hand, if the fillers are first dispersed in a water solution of a stabilizing soap, the air is entrapped in the form of very fine bubbles which are evenly dispersed through the stabilizer solution. When the filler dispersion is added to the latex, the fine air bubbles are evenly distributed throughout the liquid composition and will remain in the composition even for long periods of storage. The above method of introducing fillers into the composition has the added and very important advantage of reducing the natural coagulating action of the fillers on the latex, thus allowing the use of substantially smaller amounts of stabilizer than would normally have to be added to the composition. This is of particular importance when heat-sensitive stabilizers are used, as shown above.

We have found that the amount of gas in the liquid composition may vary within rather wide limits. While it is preferred to use an amount equivalent to about 20 percent of the volume of the liquid composition, good results may be obtained with as little as 10 percent, or even about 5 percent of the bubbles of gas are very small. The upper limit of the amount of gas which may be dispersed in the compound is determined chiefly by practical considerations such as extra bulk of the compound, ease of handling, and so forth. In general, it is preferred to incorporate not more than about 30 percent of finely dispersed gas into the liquid composition.

The presence of a dispersed gas in the gasketing composition has another very important effect. As set forth above, the protective, stabilizing materials in latex-based gasketing compositions tend to migrate to the gasket-closure interface during the drying and coagulation step as ordinarily carried out. The air cells present in the gasketing compositions seem to act as reservoirs or traps for the stabilizing materials, and to minimize their migration toward the closure. The extreme rapidity of the drying step is almost most important in preventing migration of the stabilizing ingredients and promoting good adhesion between the gasket and the container closure.

The rapid drying process of our invention may be carried out at any temperature which will bring about very rapid vaporization and expulsion of the water in the composition and at the same time will not harm the elastomeric polymer and other constituents of the gasketing material. In general, temperatures in the range between about 220° F. and about 400° F. are suitable. At these temperatures, the gaskets ordinarily used for sealing glass jars and bottles, which are about 0.060 inch thick in their puffed state, will dry in from one to three minutes. Gaskets for use on pail covers, however, are much thicker, about 0.300 inch, and will require from five to ten minutes. On the other hand, the very thin gaskets sometimes used for special sealing jobs, about 0.020 inch thick, may dry in as little as 30 seconds. The thickness, type or mass of the metal or other material from which the container closure is made will also have some influence on the speed of drying and consequently must be taken into account in determining the temperature at which the gaskets are dried. Drying is preferably carried out in an oven of the type described in United States Patent No. 2,610,131, in which heated, high velocity air is passed over the material to be dried. Especially good results are obtained when liquid gasketing compositions containing heat-sensitive stabilizing agents are dried at progressively increasing temperatures, as for example in a two- or three-zone oven.

The liquid gasketing compositions which are used in the process of our invention are based on water dispersions of elastomeric polymers, which are referred to herein as latices. Natural rubber latex may be used, as well as water dispersions of any of the well-known synthetic elastomers such as, for example, butadiene-styrene copolymers, butadiene-acrylonitrile copolymers, butadiene-styrene-acrylonitrile terpolymers, polychloroprene (neoprene), polysulfide rubber (Thiokol), and butyl rubber. The latex may be compounded as desired in order to impart the desired properties to the finished gasket and to reduce the cost of the material. Mineral fillers, for example, such as zinc oxide, calcium carbonate, barytes, talc, clay and the like may be added to the liquid composition. Gums, resins, vulcanizing agents, antioxidants and the like may also be added to the liquid compositions as desired.

Our invention will be more clearly understood by reference to the following examples in which all parts are by weight.

*Example I*

A 60 percent total solids natural rubber latex was stabilized by adding one part of sodium lauryl sulfate to 167 parts of the latex. To this mixture was added 5.6 parts of oleic acid, 0.8 part of a 50 percent solution of sodium hydroxide, 1.7 parts of iron oxide and 1.1 parts of an antioxidant, symmetrical dibeta-naphthyl-paraphenylenediamine. 222 parts of dry whiting was stirred into the latex composition, followed by the addition of one part of sodium lauryl sulfate and enough water to adjust the total solids of the composition to about 70 percent. Finally, 6.7 parts of a 43 percent solution of zinc ammonium benzoate was added to the latex composition.

The liquid gasketing composition, which contained about 15 percent by volume of air in fine dispersion introduced into the compound with the filler, was applied through a nozzle to a series of home canning lids and was dried by passing the lids through a three-zone oven in which the zones were heated to 240°, 270°, and 300° F., respectively. The lids remained in each zone for one minute, with a total drying time of three minutes.

The dried gaskets were found to have smooth, even surfaces and a fine-grained, even cellular structure. There was no blistering, and the gaskets had excellent sealing properties.

*Example II*

A 60 percent total solids natural rubber latex was stabilized by mixing 10.5 grams of a 40 percent solution of ammonium oleate with 893 grams of the latex in a vacuum mixer, after which 2.7 grams of casein, 2.7 grams of a 28 percent solution of ammonium hydroxide, 731 grams of talc, 1200 grams of barytes, 233 grams of paraffin oil and 4.5 grams of lauryl alcohol were added and stirred into the mixture under a high vacuum so as not to entrain any air in the compound. The vacuum was released by opening the mixer, and the remainder of the compounding operation was carried out at normal pressure. A 90 gram portion of dry talc was stirred into the latex mixture followed by the addition of 125 grams of a 7.6 percent solution of formaldehyde and 55 grams of a 13.6 percent solution of polyvinyl methyl ether. The compound was stirred thoroughly until it was smooth and the total solids was adjusted to 73 percent. The air content of the composition was about 20 percent by volume, which was entrapped in the mixture by the addition of the final portion of the filler and by the stirring of the compound following the addition of the polyvinyl methyl ether.

The liquid gasketing composition was applied to a series of home canning lids and was dried by placing the lids in a 300° F. oven for a period of two minutes. The dried gaskets were found to have a fine-grained, even cellular structure, were of good appearance, not at all blistered, and had excellent sealing properties. For uses where a solid gasket was more desirable, the spongy gaskets could be compressed into solid, coherent form by pressing under a die at a pressure of about 325 pounds per square inch.

*Example III*

A filler dispersion was made by mixing 250 parts of paraffin oil, 16 parts of a 40 percent solution of ammonium oleate, 150 parts of water and 1100 parts of latex grade talc, and stirring until a smooth dispersion of the filler had been obtained. A 60 percent solids natural rubber latex was stabilized by the addition of 8.75 parts of a 40 percent solution of ammonium oleate to 833 parts of the latex, and the mixture was combined with the filler dispersion and stirred until the compound was smooth.

The rheological properties of the compound could be adjusted by adding suitable amounts of a 14 percent bentonite solution and a 5 percent gum karaya solution.

The gasketing compound made by the above procedure was found to contain about 20 percent by volume of air finely dispersed throughout the compound. The air, moreover, was in such a stable form that the compound could be stored for a period of months without substantial loss of air.

The liquid gasketing comopund made by the above procedure was applied through a nozzle to a series of metal caps. The caps were placed in a three-zone oven and dried in a period of three minutes as in Example I. The dried gaskets were found to be evenly puffed, with a fine-grained cellular structure and no blistering, and to have excellent sealing properties.

The liquid gasketing compositions shown in the above examples are extremely stable and may be stored for long periods of time at normal temperatures, yet gel quickly enough during the drying cycle so that the quick-drying process of our invention may be carried out successfully. The finely dispersed air in the compositions shown above is normally in sufficiently stable form so that it is not lost during long periods of storage. If some of the dispersed gas should be lost on storage, however, it may be replaced in the compound by stirring, by the introduction of a prepared foam or soap-suds or by the introduction of compressed gas immediately before the compound is applied to the container closures.

The process of our invention, as exemplified by the above examples, makes possible the extremely rapid production of dried gaskets on container closures, the drying time having been reduced from the conventional 60 to 90 minute cycle down to about three minutes or less for standard-size gaskets. This tremendous reduction in drying time has been accomplished, furthermore, without blistering or in any way impairing the sealing properties of the resulting gaskets.

We claim:

1. A method of making a gasket for a container closure which includes the essential steps of applying to the closure an annulus of an aqueous liquid gasketing composition which comprises a heat-gellable latex having at least 5 percent by volume of a gas dispersed as fine bubbles therein, and drying said composition in not more than 10 minutes by heating said annulus to a temperature in the range of about 220° to 400° F. whereby gelling of said composition is initiated during the first half of the drying cycle thereby leaving on said closure an annular gasket containing a multiplicity of interconnected small cells and a smooth unblistered surface.

2. The method of claim 1 in which the gas is air and is present in an amount between about 5 and 30 percent by volume.

3. The method of claim 1 in which the latex is a water dispersion of an elastomeric polymer selected from the group consisting of natural rubber, butadiene-styrene copolymers, butadiene-acrylonitrile copolymers, butadiene-styrene-acrylonitrile terpolymers, polychloroprene, polysulfide rubber, butyl rubber and mixtures thereof.

4. The method of claim 1 in which the composition contains a heat-sensitive stabilizer.

5. The method of claim 4 in which the heat-sensitive stabilizer is an ammonium soap.

6. The method of claim 1 in which the composition contains a heat-activable gelling agent.

7. The method of claim 6 in which the gelling agent is a complex zinc ammonium salt.

8. The method of claim 6 in which the gelling agent is polyvinyl methyl ether.

9. A container closure having an annular sealing gasket thereon, said gasket having been made by the process of claim 1.

(References on following page)

References Cited in the file of this patent

UNITED STATES PATENTS

| | | |
|---|---|---|
| 1,427,133 | Taliaferro | Aug. 29, 1922 |
| 2,114,308 | McGowan et al. | Apr. 19, 1938 |
| 2,336,944 | Madget et al. | Dec. 14, 1943 |
| 2,469,894 | Rogers | May 10, 1944 |
| 2,472,055 | McFadden et al. | May 31, 1944 |
| 2,598,127 | Keckler | May 27, 1952 |
| 2,684,774 | Aichele | July 27, 1954 |
| 2,706,183 | Carter | Apr. 12, 1955 |
| 2,742,358 | Brown | Apr. 17, 1956 |
| 2,755,258 | Hay et al. | July 17, 1956 |
| 2,791,567 | Lowe et al. | May 7, 1957 |
| 2,822,338 | Hay | Feb. 4, 1958 |
| 2,845,659 | Calvert | Aug. 5, 1958 |
| 2,856,372 | Novak et al. | Oct. 14, 1958 |
| 2,885,372 | Kelly | May 5, 1959 |
| 3,006,868 | Stamberger et al. | Oct. 31, 1961 |
| 3,015,854 | McClure | Jan. 9, 1962 |
| 3,032,826 | Brillinger | May 8, 1962 |
| 3,037,474 | Nivikas | June 5, 1962 |
| 3,083,124 | Rahmes | Mar. 26, 1963 |
| 3,096,898 | Hohl et al. | July 9, 1963 |
| 3,118,783 | Nagle et al. | Jan. 21, 1964 |

FOREIGN PATENTS

| | | |
|---|---|---|
| 615,282 | Canada | Feb. 28, 1961 |

OTHER REFERENCES

Kingzett: "Chemical Encyclopedia," third edition, 1924, pages 142–143.